US008819731B2

(12) United States Patent
Leley et al.

(10) Patent No.: US 8,819,731 B2
(45) Date of Patent: Aug. 26, 2014

(54) SYSTEM AND METHOD FOR SYNCHRONIZING AN ELECTRONIC PROGRAM GUIDE WITH PAUSED PROGRAMS

(75) Inventors: Suresh V. Leley, Carmel, IN (US); Thomas Anthony Stahl, Indianapolis, IN (US); Steven Charles Rhoads, Carmel, IN (US); Darrel Wayne Randall, Danville, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 13/580,389

(22) PCT Filed: Feb. 25, 2011

(86) PCT No.: PCT/US2011/026179
§ 371 (c)(1),
(2), (4) Date: Aug. 22, 2012

(87) PCT Pub. No.: WO2011/106601
PCT Pub. Date: Sep. 1, 2011

(65) Prior Publication Data
US 2012/0324510 A1  Dec. 20, 2012

Related U.S. Application Data

(60) Provisional application No. 61/308,577, filed on Feb. 26, 2010.

(51) Int. Cl.
*H04N 5/445* (2011.01)
*H04N 21/433* (2011.01)
*H04N 21/482* (2011.01)
*H04N 21/458* (2011.01)

(52) U.S. Cl.
CPC ......... *H04N 21/458* (2013.01); *H04N 21/4333* (2013.01); *H04N 21/4821* (2013.01)
USPC .............................................. 725/39; 725/50

(58) Field of Classification Search
CPC .................... H04N 21/482; H04N 21/26283
USPC .............................................. 725/39, 56, 50
See application file for complete search history.

(56) References Cited

U.S. PATENT DOCUMENTS

2002/0054068 A1   5/2002  Ellis et al.
2004/0181811 A1 * 9/2004  Rakib ........................... 725/122

(Continued)

FOREIGN PATENT DOCUMENTS

EP    1028589         8/2000
EP    1028589 A1 *   8/2000    ............. H04N 5/445

OTHER PUBLICATIONS

Search Report.

*Primary Examiner* — Nasser Goodarzi
*Assistant Examiner* — Michael Hong
(74) *Attorney, Agent, or Firm* — Robert D. Shedd; Vincent E. Duffy; James McKenzie

(57) ABSTRACT

An apparatus and method for providing an electronic program guide (EPG) to an end user are provided. The includes a audio video streaming device, content scheduler, and program guide generator provide for includes providing a program guide, the program guide containing a start time and end time for the display of a first program, providing the first program for display at the start time, determining if the first program has been paused during the display of the first program, adjusting the end time for the display of the first program if the program has been paused, and providing an updated program guide containing the adjusted end time.

14 Claims, 4 Drawing Sheets

(56) References Cited

U.S. PATENT DOCUMENTS

| | | |
|---|---|---|
| 2006/0064721 A1 | 3/2006 | Del Val et al. |
| 2006/0126844 A1* | 6/2006 | Mauro ................. 380/261 |
| 2006/0156065 A1 | 7/2006 | Glass |
| 2006/0227706 A1 | 10/2006 | Burst |
| 2007/0172061 A1* | 7/2007 | Pinder ................. 380/240 |
| 2008/0163306 A1 | 7/2008 | Sonoda |
| 2009/0158311 A1* | 6/2009 | Hon et al. ............. 725/14 |

* cited by examiner

SYSTEM AND METHOD FOR SYNCHRONIZING AN ELECTRONIC PROGRAM GUIDE WITH PAUSED PROGRAMS

REFERENCE TO RELATED PROVISIONAL APPLICATION

This application claims the benefit, under 35 U.S.C. §365 of International Application PCT/US2011/026179, filed Feb. 25, 2011 which was published in accordance with PCT Article 21(2) on Sep. 1, 2011 in English and which claims the benefit of U.S. provisional patent application No. 61/308,577, filed Feb. 26, 2011.

TECHNICAL FIELD OF THE INVENTION

The present disclosure generally relates to digital content systems and methods for delivering content to an end user, and more particularly, to a system and method for providing an electronic program guide (EPG) to an end user.

BACKGROUND

Due to the advent of cable television, direct satellite systems, and other television program broadcast systems, viewers have very large numbers of programs from which to select. Sophisticated systems have been developed to assist a viewer in selecting programs to view or record, among which are the EPG. An EPG is displayed on a display screen as an interface. In essence, an EPG is an interactive, on screen equivalent to listings found in local newspapers or other print media. An EPG interface can provide several different kinds of information about each program that is within the time frame covered by the EPG. The time frame typically ranges from the next hour up to seven days in advance. EPG program information is usually displayed in a two dimensional grid comprising a plurality of program cells wherein each cell corresponds to a particular program. Typically, the EPG program schedule grid has time on one axis and channel number on the other axis.

One such system employing an EPG is a system for providing satellite entertainment services and locally stored entertainment services to paying customers on a people transporter, such as an airplane. The system architecture is based on land based systems such as those used in multi-dwelling units (MDU). All of the programming is made available to the user via one unified Electronic Program Guide (EPG) on the seat display. The visual EPG is constructed from several sources. The satellite programming is accompanied by a satellite EPG stream that covers the satellite programming while the local content EPG stream is generated locally.

One distinguishing characteristic between the entertainment services systems such as those used on an airplane and other IP based entertainment systems is a requirement to pause stored programs during e.g., flight announcements over the airline public address (PA) system. However, when a program is time shifted due to a pause, there is a mismatch between the EPG and the actual program played. Changing channels and returning to the previously viewed channel will pre-empt the time shifted program.

Therefore, a need exists to provide techniques for updating and providing program guide information including program start/stop times in a locally generated EPG.

SUMMARY

According to one aspect of the present disclosure, a method is provided that includes providing a program guide, the program guide containing a start time and end time for the display of a first program, providing the first program for display at the start time, determining if the first program has been paused during the display of the first program, adjusting the end time for the display of the first program if the program has been paused, and providing an updated program guide containing the adjusted end time.

According to another aspect of the present disclosure, a system for providing a program guide for a video system includes an audio video streamer that provides a first program for display, a content scheduler, coupled to the audio video streamer, the content scheduler determining if a pause in the first program has been executed during the display of the first program and adjusts an end time for the display of first program, and a program guide generator coupled to the content scheduler, the program guide generator providing a program guide containing a start time and end time for the display of a first program, the program guide generator further providing an updated program guide with the adjusted end time for the display of the first program.

BRIEF DESCRIPTION OF THE DRAWINGS

These, and other aspects, features and advantages of the present disclosure will be described or become apparent from the following detailed description of the preferred embodiments, which is to be read in connection with the accompanying drawings.

In the drawings, wherein like reference numerals denote similar elements throughout the views.

Figure 1:
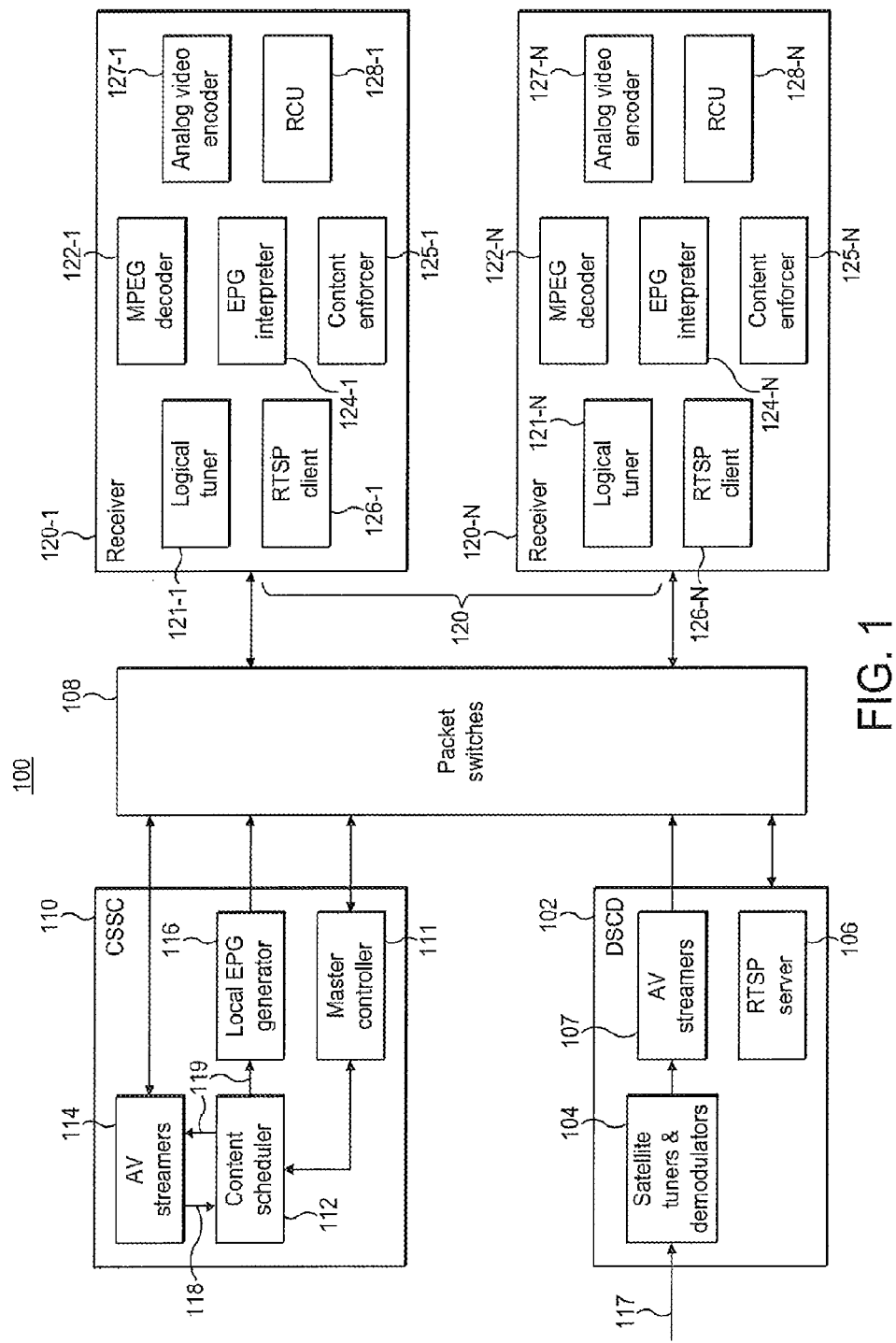
FIG. 1 is a block diagram of an exemplary embodiment of a system for delivering video content in accordance with the present disclosure.

It should be understood that the drawings are for purposes of illustrating the concepts of the disclosure and is not necessarily the only possible configuration for illustrating the disclosure.

DETAILED DESCRIPTION

The present principles include systems and methods for providing a program guide interface in IP Video Distribution systems. Although the present principles are described herein below primarily within the context of an airplane multimedia distribution system, the specific implementations of the present principles should not be treated as limiting the scope of the invention. It is appreciated by those skilled in the art and informed by the teachings of the present principles that the concepts of the present invention can be advantageously applied in other types of multimedia content distribution systems. For example, the concepts of the present principles can be implemented in satellite broadcasting systems, cable television broadcasting systems and the like.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting principles, aspects, and implementations of the present principles, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it is appreciated by those skilled in the art that the block diagrams presented herein represent conceptual views of illustrative system components and/or circuitry embodying the principles of the invention. Similarly, it is appreciated that any flow charts, flow diagrams, state transition diagrams, pseudocode, and the like represent various processes which can be substantially represented in computer readable media and so executed by a computer or processor, whether or not such computer or processor is explicitly shown.

The present disclosure relates to modifying the information associated with, and delivery of, primarily video program content delivered over a network and displayed to users. The system generates and outputs a program guide containing information, such as start times, for a plurality of programs. The system and method allow a program guide to remain synchronized when one or more programs are paused. The programs may be locally added to the network (e.g., video on demand) or may be supplied from a broadcast source (e.g., satellite or cable). The program guide is provided to users on the network, which may be a "closed universe" system (e.g., apartment, or airplane). The system then determines whether a "pause" function has occurred during video programming. This pause may be an all channel pause or may only affect one or a few programs (i.e., channels) on the network. When a pause is determined, the duration of the pause is monitored. After the pause function is complete, the programming is resumed. The program guide information, and subsequently, the time for delivery of the program(s) following the currently displayed one or more programs is updated to account for the elapsed time of the pause. In this way, program content will not be missed for either the current program or the programs following. In the case that the program content is broadcast content (i.e., live feed), video recording and playback may be used to "delay" the program(s) as needed.

Referring now in specific detail to the drawings in which like reference numerals identify similar or identical elements throughout the several views, and initially to FIG. 1, a high level block diagram of an exemplary IP video content distribution system 100 for providing a program guide for local content and satellite content in accordance with one exemplary implementation of the present principles is illustrated. System 100 includes a Digital Satellite Concentrator and Distributor (DSCD) 102, a Content Server and System Controller (CSSC) 110, Ethernet switches 108 and a series of Receivers 120-1 to 120-N, including Decoders 122-1 to 122-N and EPG Interpreters 124-1 to 124-N, respectively.

The receivers 120 can, for example, respectively service video displays for each passenger seat.

The DSCD 102 can act as a satellite gateway for the content distribution system. For example, DSCD 102 can receive video content data streams and corresponding program guide information from a satellite service provider (not shown) along line 117 through satellite tuners and demodulators 104. The satellite audio/video and EPG streams are passed to the Audio Video (AV) Streamers 107 where channels are package in IP protocols and are streamed onto the local network. Functions of the DSCD 102 can include modifying received satellite EPG packets to indicate the presence of a local network so that a receiver 120 can acquire the guide for local content generated by the CSSC 110. Additionally, the DSCD 102 can include a Real Time Streaming Protocol (RTSP) Server 106 to service receivers 120 by receiving local and satellite content tuning requests and responding to the receivers 120 by sending corresponding IP multicast group addresses on which requested video streams can be found. Here, the RTSP server 106 can distinguish between tuning requests for local content and tuning requests for satellite content. Further, audio/video content and guide information received from the satellite can be sent by the DSCD 102 to the receivers 120 on an Audio/video Digital Satellite Service (DSS) or Digital Video Broadcasting (DVB) Transport Stream (TS) encapsulated in IP and related protocols through switches 108.

The CSSC 110 can be the primary system controller that is responsible for overall system operation and local content insertion. For example, local content can include a video informing passengers of customs regulations or a video instructing passengers of safety precautions. However, it should be understood that in other implementations, such as cable television systems, local content insertion can include insertion of other types of content, such as commercials and advertisements, for example, within audio/video (AV) streams. Further, it should be noted that local content can also comprise entertainment programs or motion pictures stored within CSSC 110. Components of the CSSC 110 can include, inter alia, an AV Streamer or Data Pump 114, a Content Scheduler 112, a Local Electronic Program Guide (EPG) Generator 116, and a Master Controller 111, each of which is discussed herein below.

The AV Streamer 114 can be configured to generate and stream AV content onto the local network at a proper rate. For example, the AV Streamer 114 can aggregate and encapsulate packets from a digital video file into a Real-time Protocol (RTP)/User Datagram Protocol (UDP)/Internet Protocol (IP) stream.

The Content Scheduler 112 may control insertion of local content and local EPG streams by employing a Local Guide extended markup language (XML) file 119. The Local Guide XML file may include a base time, channel listing, program listings, and related information, optional pause functionality for channels, file names of files and schedules, which can be offset by a base time.

In some implementations of the present principles, the AV Streamer 114 can act as the front end for content scheduler input. For example, the AV Streamer 114 can be configured to monitor an XML file corresponding to a schedule of local programming, local content filenames and high-level commands such as "PAUSE." In addition, the AV streamer 114 can parse XML files and supply guide generation related inputs to the Local EPG Generator 116, which is discussed in more detail below. In general, the AV Streamer 114 can be controlled through the Local Guide XML file 119 generated by the Content Scheduler 112.

Further, the AV Streamer 114 can inform the Content Scheduler 112 of the content currently playing, when certain content has finished playing, and the state of AV streamer 114 through a Now Playing (NP) XML File 118. The playing status of content can be useful for pausing or un-pausing content for the display of locally inserted content, as discussed below with respect to the Content Scheduler 112. The format of the NP XML File can include a base time, a timestamp and a channel listing, which can reference all channels. The channel listing can include a channel name, channel objects, which can include a user-recognizable number, name and logo, and program information.

The base time can indicate a time by which all program start times and end times or other events are measured. For example, a base time can be specified as seconds since a predetermined time, e.g., Jan. 6, 1980 12:00 am, and all program start and end times can correspond to the total number of seconds after the base time, i.e., an offset from the base time.

The AV Streamer 114 can further include an XML parser (not shown) that can parse the Local Guide XML file 119 for control purposes. Alternatively, the XML parser can be independent of the AV Streamer 114 and can parse the Local Guide XML file 119 for both the AV Streamer 114 and the Local EPG Generator 116. The AV Streamer 114 can monitor the Local Guide XML files for any changes to the status of channels or programs. The EPG Generator 116 uses the schedule information from the Local Guide XML file to construct local EPG streams. In this implementation, Fast Load and Slow Carrousel streams are created and transmitted onto the local network at the proper rate.

The Master Controller 111 in the CSSC 110 is responsible for all high-level system operation and coordination. It keeps track of passenger credit card payments for each seat, controls DSCD configuration settings, controls the Content Scheduler, and has a private communication channel to elements in the Receivers 120, such as the Content Enforcers 125. It also takes input from an operator's console (not shown).

Further, the Master Controller 111 can also institute a denial or grant of access to local or satellite channels for a receiver through communications to the Content Enforcer 125 in a Receiver 120. It should be noted that in one or more implementations of the present principles, Master Controller 111 can employ a separate communications channel to control Content Enforcer 125, which interacts with the EPG interpreter 124 of Receiver 120 so that only programs in the EPG that a Receiver 120 is authorized to view are displayed in the EPG. In addition, the separate communications channel can be utilized by the Master Controller 111 to control which channels a particular receiver can tune to for the display of video content, for e.g., content that the customer has paid for. The Master Controller 111 keeps track of financial transactions for each receiver such as credit card swipes. Further, the Master Controller 111 can coordinate receivers and control which channels are displayed in a program guide at a receiver by employing unique channel object identifiers to reference channels.

The entertainment system includes a series of Receivers 120-1 to 120-N. The Receivers 120-1 to 120-N may respectively include Logical Tuners 121-1 to 121-N, MPEG decoders 122-1 to 122N, EPG interpreters 124-1 to 124-N, Content Enforcer 125-1 to 125-N, RTSP Clients 126-1 to 126-N, Analog Video Encoders 127-1 to 127-N, Remote Control Unit (RCU) receivers 1281 to 128-N, Video Display Units (VDUs) (not shown), and credit card readers (not shown) respectively. The Receivers 120 can, for example, respectively service video displays and receive inputs, e.g., passenger commands, from respective RCUs. There is one receiver for each passenger on the airplane.

The Receiver software structure is based on hardware and software used in a standard satellite set-top box (STB) that directly tunes the RF satellite signal. Because of that, it contains a Logical Tuner 121, which takes the place of the RF tuner. Tuning information to the logical tuner includes information such as satellite, transponder frequency, and signal polarity. Once a tuning request is approved by the Content Enforcer 125, this information is turned into a RTSP tune request by the RTSP Client 126.

The MPEG Decoder 122 receives multicast audio/video streams from the network via a network interface and Logical Tuner 121. Local AV streams are transmitted from the CSSC 110 and Satellite AV streams are forwarded onto the local network by the DSCD 102. The MPEG decoder can parse the AV Stream, decode the video, decode audio, and present it to the Analog/Video Encoder for transmission to the VDU and headset (not shown).

The EPG Interpreter 124 receives multicast EPG streams from the network via a network interface and Logical Tuner 121. Local Guide streams are transmitted from the CSSC 110 and satellite guide streams are forwarded onto the local network by the DSCD 102. The EPG Interpreter 124 decodes each guide stream, combines the information from both local and satellite guides, and creates one unified EPG to be presented to the passenger on the VDU. Only channels allowed to be displayed by the Enforcer Table in the Content Enforcer 125 will be displayed in the EPG.

The Content Enforcer 125 works with the EPG Interpreter 124 to display only valid channels for the offered entertainment service. Not all available satellite channels are in the channel lineup. The Content Enforcer 125 also works with the RTSP Client 126 to make sure that only channels that the customer is allowed to see (e.g., has been paid for) can be tuned. The Content Enforcer 125 includes a structure called the Enforcer Table (not shown) which is used to control these actions. The Enforcer Table is created and sent to the Content Enforcer 125 by the Content Scheduler 112 in the CSSC 110.

The Enforcer Table is a structure that provides information, for each channel, required to determine whether or not a channel should be shown in the EPG and if the user may watch programs on that channel. All program access to the Content Enforcer 125 is based on the unique 32-bit channel identifier associated with each channel. This identifier is the channel object identifier (ID) from the EPG data stream.

A customer/passenger can request to watch a specific channel (local or satellite) by choosing that channel on the EPG using the RCU 128. If the requested channel requires extra payment, the Receiver 120 presents the customer with on screen displays (OSDs) that allow them to pay by credit card. Payment information is sent back to the Master Controller 111 in the CSSC 110 via a separate control channel over the local network. The Content Scheduler 112 in the CSSC 110 then updates the Enforcer Table in the Receiver 120, allowing that channel to be tuned. Once the customer is allowed to watch a channel, the tune request for that channel is transformed into a RTSP Request by the RTSP Client 126 and is sent over the local network to the RTSP Server 106 in the DSCD 102.

The DSCD 102 decides if the RTSP Request is for local content or satellite content depending on the tuning information contained in the RTSP request. If it is for a satellite channel, then the DSCD 102 makes sure that the requested channel is present in an IP Multicast on the local network. It then responds to the Receiver 120 with the IP Multicast Address to which the Receiver 120 should tune to receive the requested AV stream. If it was a request for stored content, the DSCD 102 sends an RTSP response back to the Receiver 120 with the IP multicast address of the AV stream for that local channel. In either case, the Receiver 120 then uses Internet Group Management Protocol (IGMP) to join the correct IP multicast stream.

As stated above, the Content Scheduler 112 can control user-access to video streams, insertion of local content, and EPG displays by employing the Local Guide XML file 119. The Local Guide XML file 119 can include a base time, channel listing, program listings and related information, optional pause functionality for channels, file names of files and schedules, which can be offset by a base time. The pause functionality can be used to pause a channel for the insertion of forced local content and to unpause the channel when the display of the forced local content is finished, as discussed more fully below.

It is important to note that generation and modification of the program guide as described herein is advantageous for entertainment services systems that may include frequent and unexpected interruptions. Systems provided on airplanes or in transportation terminals must include important safety and information activities and usually require the attention of all people present. The operations described herein highlight the ability to delay the playback and display of programming, account for the delay, and shift the programming schedule of the content as necessary. It is important to note that local control of these operations allows control over which programs and channels are delayed.

Based on the architecture provided above, several features are possible for manipulation of the channel guide and user control. More particularly, a pause feature is implemented by manipulation of the Local Guide XML file 119 and Now Playing XML file 118 by the AV Streamer 114 and EPG Generator 116, collectively known as a video pump. The XML files are updated to provide a time shifted EPG based on a duration of the pause.

The Local Guide XML File 119 is created by the Content Scheduler 112 and is used for two distinct purposes: to generate 2 Local APG Streams (Fast Load and Update Carousel) and control the video pumps, i.e., AV Streamer 114 and EPG Generator 116. The Local Guide XML file contains at least the following:

Base Time
List of Channels that include:
Channel Name
Channel Description
Channel Object ID
Channel Logo Index
Channel Category
Channel Audios
Default Program
   Program Name
   Program Description
   Program Rating
   Program Filename
List of Programs in order of appearance that include:
   Program Name
   Program Description
   Program Rating
   Program Start Time
   Program End Time (to be shown in the guide)
   Program Filename
Optionally Pause The Local Guide XML file 119 contains the filenames of the files to be played and their schedules. The time schedules mentioned in the program information are offset values from the Base Time. Base Time is extracted from <base_time> tag specified in the XML file, as illustrated below. Whenever there is change in the schedule of any program, the Local Guide XML file 119 is updated. The Content Scheduler 112) will receive a signal when this file has changed. It will then read the file and interpret the information.

Local Guide XML File Tags are illustrated below in Table 1:

TABLE 1

Local Guide XML File Tags

| Start Tag | End Tag | Context where valid | Valid Values |
|---|---|---|---|
| APG Generation and Stream Schedule | | | |
| <base_time> | </base_time> | base | Specifies the base time from which all event times are offset. Specified as seconds since 12:00 am January 6, 1980. (e.g., January 1, 2008, 12:00 am is 883,094,400 seconds). Currently, for testing convenience, a base time that is ±1 day from the current time will be treated as "now." |
| <channel> | </channel> | base | Starts a channel context and specifies the major/minor channel numbers. Each number may have values from 0 to 999. |
| <program> | </program> | <channel> | Starts a program context that may serve as the default program for a channel or as a scheduled program. |
| <channel_name> | </channel_name> | <channel> | Text string (32 Character Max.) |
| <object_ID> | </object_ID> | <channel> | 0xFFFF F000 to 0xFFFF F03F. Must be unique per channel. |
| <channel_description> | </channel_description> | <channel> | Optional. Text string (256 Character Max.) |
| <channel_time_offset> | </channel_time_offset> | <channel> | Optional. Offset from Base Time in seconds. Can be used to delay schedule of a single channel after a pause. |

TABLE 1-continued

Local Guide XML File Tags

| Start Tag | End Tag | Context where valid | Valid Values |
|---|---|---|---|
| <logo_index> | </logo_index> | <channel> | Optional. The logo index assumes any value from 0 to 255, and for extended logo's it assumes any value from 512 to 705. All the logos are stored in the SSB flash on the receiver and are accessed using the logo index. Note that the logo indices are specified in the Logo Index Chart provided by Service Provider. |
| <category> | </category> | <channel> | "Movies" "Sports" "Interests" "Lifestyles" "News" "Themes" "Show Types" "Age Appropriate" "Action" "Entertainment" "Informational" |
| <audio> | </audio> | <channel> | "English" "Spanish" "French" "German" "Italian" "Japanese" "Korean" "Chinese" "Portuguese" "Sound" |
| <live> | </live> | <channel> | Appears in a channel context for channels that are real-time AV inputs (e.g., camera, Map Channel, etc.). In those cases, there is no program schedule. The program filename must be a named pipe. |
| <name> | </name> | <program> | Text string (128 Character Max.) |
| <description> | </description> | <program> | Text string (256 Character Max.) |
| <rating> | </rating> | <program> | "None" "G" "PG" "PG-13" "R" "NC-17" "X" "NR" "TV-G" "TV-PG" "TV-14" "TV-MA" "TV-Y" "TV-Y7" |
| <filename> | </filename> | <program> | Name of the file to play. May also be associated with a real-time AV input. In that case, the filename is the name of a pipe. (64 Character Max.) |
| <time_start> | </time_start> | <program> | Offset from Base Time |
| <time_end> | </time_end> | <program> | Offset from Base Time |
| Stream Controls | | | |
| <pause> | </pause> | <channel> | Pause program playing on this channel until pause indicator is no longer present in the XML file. |
| <pause_all> | </pause_all> | <base> | Pause programs on all channels until the pause_all tag is no longer present in the XML file. |
| <pause_all_but_roadblocks> | </pause_all_but_roadblocks> | <base> | Pause programs on all channels except for those tagged as "roadblock." Unpause those channels when the pause_all_but_roadblocks tag is no longer present in the XML file. |

TABLE 1-continued

Local Guide XML File Tags

| Start Tag | End Tag | Context where valid | Valid Values |
|---|---|---|---|
| <roadblock> | </roadblock> | <channel> | Designates this channel as a roadblock channel. Used in conjunction with the pause_all_but_roadblock tags. |

The Local Guide XML File Stream Controls will now be described:

<pause>

<pause> is used to pause an individual program playing on the channel in which the tag is present. The program will resume from where it left off when the pause indicator is no longer present in the Local Guide XML file. Depending on the response time of the pause, the stream may be rewound by the response delay before resuming so that the customer does not miss any second of the program. The Content Scheduler 112 may want to adjust the start time of future programs by the length of the pause on the channel that was paused. If a program on a local channel gets delayed such that it will run past the start time of the next program, it will end at the start time of the next program. The next program will start when indicated, unless the start time is changed. If a channel is paused when the next program is supposed to begin, then the next program will start immediately after the pause is removed.

<pause_all>

<pause_all> is used to pause programs on all channels that are described in the Local Guide XML file. The programs will resume from where they left off when the tag is no longer present in the Local Guide XML file. It is useful if the public address system needs to break in with an announcement. The Content Scheduler 112 may want to adjust the start time of all programs in the future by the length of the pause. This can be done by merely adjusting the base time. When present, this tag must appear in the base context and be the first tag in the file. <pause_all> and <pause_all_but_roadblocks> are mutually exclusive and must not appear in the XML file at the same time.

<pause_all_but_roadblocks>

<pause_all_but_roadblocks> is used to pause programs on all channels except those marked as roadblock channels. The paused programs will resume from where they left off when the tag is no longer present in the Local Guide XML file. This tag is meant to be used along with the <roadblock> tag and with the Content Enforcer 125 in the Receiver 120 to implement the full Roadblock functionality as described below. When present, this tag must appear in the base context and be the first tag in the file. <pause_all> and <pause_all_but_roadblocks> are mutually exclusive and must not appear in the XML file at the same time.

<roadblock>

The <roadblock> tag designates the channel in which context it appears as a roadblock channel. Roadblock channels have different characteristics than normal channels. Roadblock channels must not include start/stop times for programs. Instead, it must include a default program followed by a list of programs that should be played in order when a roadblock occurs. The AV Streamer 114 will update the Now Playing file 118 as the programs in the list are played so that the Content Scheduler 112 will know when to resume regular programming and force tune receivers back to the channel they were watching prior to the Roadblock. After the roadblock programs are played, the roadblock channel will loop back to the default program. That serves as the indication that the roadblock videos are done.

The Now Playing (NP) XML file 118 provides feedback to the Local Content Scheduler 112 regarding what is currently playing. Most importantly, it lets the Local Content Scheduler 112 know when a program has finished playing, which is useful for un-pausing programs after a "Roadblock".

The Now Playing XML file contains at least the following:

Base Time

File Time Stamp

List of Channels that include:

Channel Name

Channel Object ID

Program

Program Filename

Optionally Pause

There is an entry for every channel that appears in the Local Guide XML file 119. It will be generated every time there is a change in its state. The Content Scheduler 112 will receive a signal when this file has changed. It will then read the file and interpret the information it is interested in. If for example it is waiting for a roadblock file to finish, it can look at the correct channel and verify that the file now indicates that the default file is playing. The Now Playing XML File 118 will also indicate a program is paused by including the <pause> tag in that channel.

Now Playing File Tags

TABLE 2

Local Guide XML File Tags

| Start Tag | End Tag | Context where valid | Valid Values |
|---|---|---|---|
| <base_time> | </base_time> | base | Specifies the base time from which all event times are offset. Specified as seconds since 12:00 am January 6, |

TABLE 2-continued

Local Guide XML File Tags

| Start Tag | End Tag | Context where valid | Valid Values |
|---|---|---|---|
| <time_stamp> | </time_stamp> | base | 1980. (e.g., January 1, 2008, 12:00 am is 883,094,400 seconds). Offset time from base time that this file was created (or modified). |
| <channel> | </channel> | base | Starts a channel context. |
| <channel_name> | </channel_name> | <channel> | Text string (32 Character Max.) |
| <object_ID> | </object_ID> | <channel> | 0xFFFF F000 to 0xFFFF F03F |
| <program> | </program> | <channel> | Starts a program context. |
| <filename> | </filename> | <program> | Name of the file being played. May be associated with a device such as a camera. (64 Character Max.) |

The above embodiments describe an apparatus for providing a program guide for a video system includes an audio video streamer that provides a first program for display, a content scheduler coupled to the audio video streamer, the content scheduler determining if a pause in the first program has been executed during the display of the first program and adjusts an end time for the display of first program, and a program guide generator coupled to the content scheduler, the program guide generator providing a program guide containing a start time and end time for the display of a first program, the program guide generator further providing an updated program guide with the adjusted end time for the display of the first program.

Figure 2:
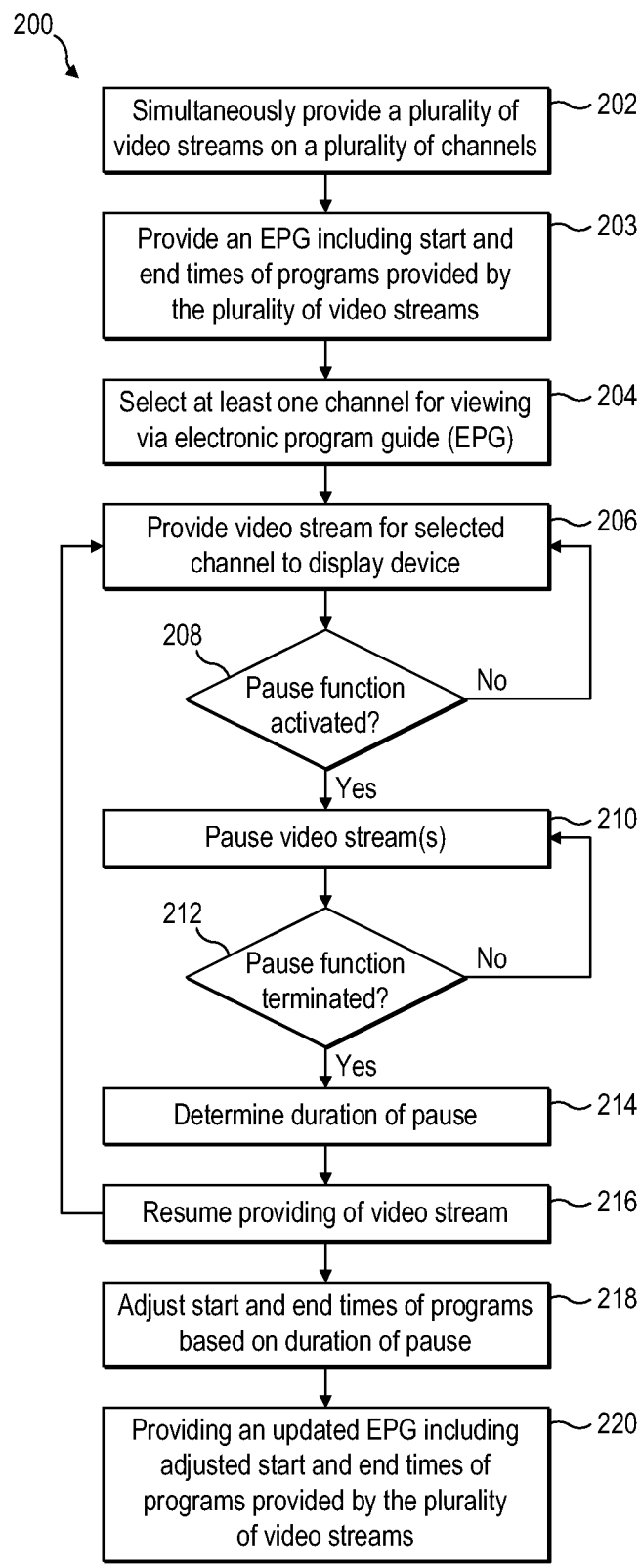
FIG. 2 is a flowchart of an exemplary embodiment of a process for providing an EPG in accordance with the present disclosure.

Referring to FIG. 2, a process 200 of implementing a pause function and reflecting a duration of the pause in an electronic program guide (EPG) is illustrated. Initially, in step 202, a plurality of video streams is provided on a plurality of channels. In step 203, information associated to start and end times of at least one program provided by the plurality of video streams is outputted and is displayed to the end user as an electronic program guide (EPG). At least one channel is selected for viewing from the displayed EPG by a user, step 204. Next, in step 206, the selected video stream is provided to a display device. In step 208, it is determined if the pause function is activated. If the pause function is activated, the selected video stream is paused, step 210. Next, it is determined if the pause function is terminated, step 212. Then, in step 214, if the pause function is terminated, a duration of the pause is determined. Additionally, if the pause function is terminated, the providing of the video stream will resume, step 216. The start and end times of the at least one program is then adjusted based on the duration of the pause, step 218. In step 220, the adjusted start and end times of the at least one program provided by the plurality of video streams is outputted and is displayed to the end user in the electronic program guide (EPG).

Although the method 200 described with reference to FIG. 2 may be implemented by various systems, the method steps described above will now be described in relation to the system provided in FIG. 1 as an exemplary illustration. Initially, in step 202, AV Streamer 114 provides a plurality of video streams on a plurality of channels which are receive by at least one Receiver 120-1-120-N. In step 203, information associated to start and end times of at least one program provided by the plurality of video streams is outputted to the at least one Receiver 120 and is displayed to the end user as an electronic program guide (EPG). At least one channel is selected for viewing from the displayed EPG by a user via RCU 128, step 204. Next, in step 206, the AV Streamer 114 provides the selected video stream to a display device, e.g., Video Display Units (VDUs) coupled to the Receiver 120-120-N.

In step 208, it is determined if the pause function is activated. The pause function is controlled by the Master Controller 111 in the CSSC 110. Consider a couple of common scenarios: In one case, a flight attendant or the pilot comes on the public address (PA) system to make an announcement. The CSSC 110 has a PA sense input. The Master Controller 111 would instruct the Content Scheduler 112, which would modify the Local Guide XML File 119. The Local Guide XML file 119 would in this case include the <pause_all> tag in the proper context.

If the pause function is activated, the selected video stream is paused, step 210. Here, the AV Streamers 114 read the XML file 119, including the <pause_all> tag, and then pause all streams. The AV Streamers 114 then update the NowPlaying XML file 118, confirming that the pause has occurred.

Next, it is determined if the pause function is terminated, step 212. Then, in step 214, if the pause function is terminated, a duration of the pause is determined. Additionally, if the pause function is terminated, the AV Streamer 114 will resume providing of the video stream, step 216. Referring back to the example above, when the PA announcement is over, the CSSC 110 senses that the PA system is off. The Master Controller 111 then instructs the Content Scheduler 112 that the PA system is off and the Content Scheduler 112 removes the <pause_all> tag. The AV Streamers 114 see that the tag is no longer there. At that point, the AV Streamers 114 resume streaming. In one embodiment, the Master Controller 111 may determine and store the duration of the pause. In other embodiment, the Content Scheduler 112 may determine the duration of the pause.

In another example, "roadblock" may cause the pause function to be activated. A Roadblock is an event where the video to all of the VDUs get's interrupted and replaced by a "Roadblock Video", e.g., a safety video. For pre-recorded videos, such as the safety video, the <pause_all_but_roadblock> tag would be used. The process is the same as described for <pause_all>, except that the Content Scheduler 112 also inserts the <roadblock> video information into the guide stream and the Master Controller 111 in the CSSC 110 communicates with the Content Enforcer 125 in the Receiver 120 to cause the Receiver 120 to force tune to the <roadblock> channel while it is on. In this case, the length or duration of the pause is ultimately determined by the length of the roadblock video. The Content Scheduler 112 receives feedback from the AV Streamer 144 via the NP XML file 118 that the roadblock video has completed. The Content Scheduler 112 informs the Master Controller 111, which then instructs the Content Scheduler 112 to remove the roadblock channel and <pause_all_but_roadblock> from the Local Guide XML file 119. The Local EPG Generator 116 updates the EPG streams and the AV Streamers 114 continue streaming from where they left off. The Master Controller then instructs the Content Enforcer 125 to force tune the Receiver 120 back to the previous channel the Receiver 120 was tuned to.

The start and end times of the programs will then be updated based on the duration of the pause, step 218. The program start and end times, defined by tags <time_start> and <time_end> in the Local Guide XML File 119, for all programs are specified in each program context. These values are relative to the base time from which all event times are offset, i.e., <base_time> defined in the base context. In one embodiment, the duration of the pause will be added to the base time of the system, i.e., <base_time>. In this embodiment, the base time of the Local Guide XML File 119 will be adjusted and program start and end time offset values, defined by tags <time_start> and <time_end> will remain unchanged. When displaying the EPG, the base time will be added to the program start and end time offset values and will result in new program start and end times being displayed to the end user.

In another embodiment, the duration of the pause will then be added to either the program end time offset value <time_end> or both of the program start and end time offset values, <time_start> and <time_end>. The updated values for the program start and end times will then be reflected in the EPG displayed to the end user. An example of this embodiment may include the situation involving when an end user pauses a single program being viewed. It is to be appreciated that depending on the duration of the pause, the program start and end times of subsequent programs on a particular channel will also be offset to reflect that a pause has occurred. Alternatively, the duration of the pause can be employed to adjust the timing of a single channel, i.e., by adjusting the <channel_time_offset> tag in the Local Guide XML file 119. This tag is employed to adjust the time of every program in a channel if only that channel is paused.

The adjusted start and end times will be reflected in the Electronic Program Guide (EPG), step 220, as will be illustrated in the example below.

Figure 3A:
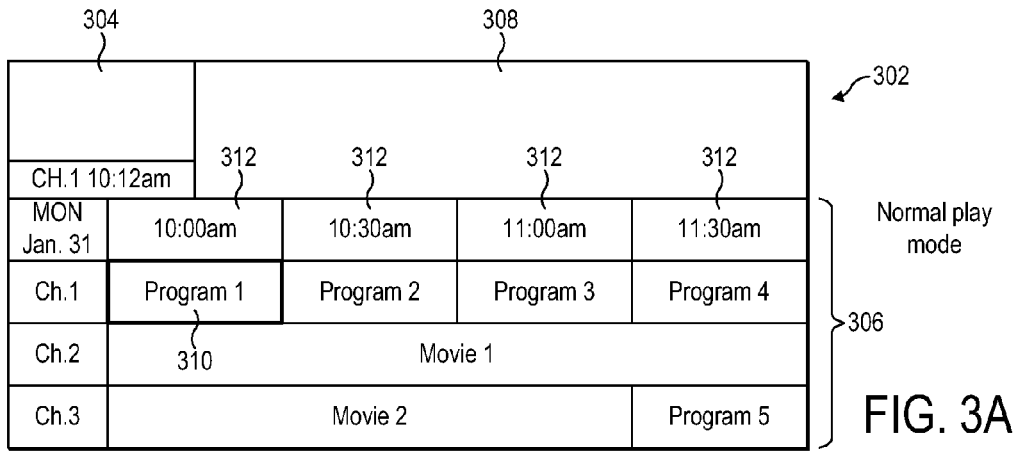
FIG. 3A is an exemplary view of an EPG in accordance with the present disclosure.
Figure 3B:
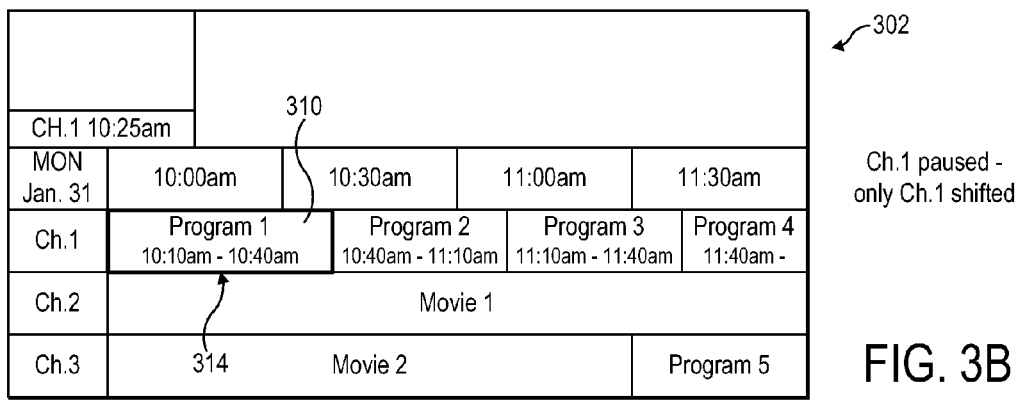
FIG. 3B is an exemplary view of an EPG in accordance with the present disclosure.
Figure 3C:
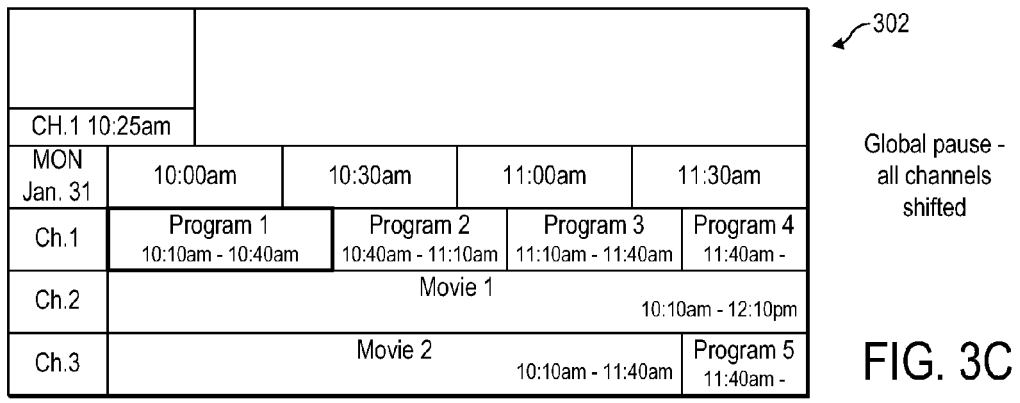
FIG. 3C is an exemplary view of an EPG in accordance with the present disclosure.

Referring to FIGS. 3A, 3B, and 3C, several views of an Electronic Program Guide (EPG) are illustrated. FIG. 3A illustrates a view of EPG 302 under normal playing conditions. Program guide display 302 includes the currently tuned program display 304, positioned at the top-left portion of the screen, a program guide 306 and a program information display 308. After the program guide function is launched, the currently tuned program is designated and appears highlighted with an outline in program cell 301 in program guide display 302. The currently tuned program is displayed in the currently tuned program display 304, and detailed program information on the selected/highlighted program (corresponding to program cell 310) is displayed in the program information display 308. The program guide 306 includes time slots or cells 312 divided by a predetermined time, e.g., 30 minute intervals. As shown in FIG. 3A, each cell below the time cells 312 correspond to a program or movie being played at the time indicated by the time cell 312. For example, program 1 in selected cell 310 has a start time of 10:00 am and an end time of 10:30 am and is being played on Channel 1 (Ch1).

FIG. 3B illustrates a view of the EPG 302 which reflects a pause to implemented on channel 1. In this view, the EPG was updated to compensate for a pause activated on channel 1. In this example, the pause duration is ten minutes and the current cell 310 and subsequent cells are shifted to reflect the ten minute pause. In one embodiment, an indicator 314 is provided in each cell to show the shift in time of the playing content. In FIG. 3B, the indicator in each cell for channel 1 includes the ten minute time shift, e.g., 10:10 am-10:40 am; 10:40 am-11:10 am; etc. In certain embodiments, only the end time will reflect the time shift and the indicator will read as 10:00 am-10:40 am for cell 310.

In FIG. 3C, the EPG 302 reflects the ten minute time shift for all channels. Here, a pause all function was implements, i.e., via the <pause_all> tag in the Local Guide XML File 119. As in the example above for FIG. 3B, the pause duration is ten minutes. Assuming the pause was implemented during the time slot of 10:00 am-10:30 am, for example, was initiated at 10:15 am, programming on all available channels will reflect a ten minute pause as shown in FIG. 3C. In this scenario, the pause duration is added to the base time.

An exemplary illustration of the manipulation of the XML files in accordance with the teachings of the present disclosure will now be provided.

An exemplary format of the Local Guide XML File 119 is illustrated in the below. The first program with a channel is the default program. It does not have start and end times. If no programs are active for a channel then the default program text and filename are used. All times are GMT seconds. Base Time specified as seconds since 12:00 am Jan. 6, 1980. In the example below, the Base Time is set to Feb. 18, 2011, 14:00:00 UTC.

Assume that the Local Guide XML File 119 shown below is created and sent to the Local EPG Generator 116 and AV Streamers 114. Channel 3 (i.e., object_ID=0xFFFFF002) is identified as a roadblock channel.

```
<?xml version="1.0" encoding="utf-8" ?>
<base_time>982072815</base_time>
<channel major=1 minor=1>
  <object_ID>0xFFFFF000</object_ID)>
  <channel_name>LC1</channel_name>
  <channel_description>This channel is setup as a roadblock
  </channel_description>
  <channel_time_offset>0</channel_time_offset>
  <program>
    <name> Local Program A</name>
    <description>This is "Local Program A" on Channel 1. Default.
    </description>
    <filename>c:/tmp/LCI_ProgramStrA.mpg</filename>
  </program>
  <program>
    <time_start>0</time_start>
    <time_end>1800</time_end>
    <name>Local Program B</name>
    <description> This is "Local Program B" on Channel 1. 30 minutes.
    </description>
    <rating>PG</rating>
    <filename>c:/tmp/LCI_ProgramStrB.mpg</filename>
  </program>
  <program>
    <time_start>1800</time_start>
    <time_end>9000</time_end>
    <name>Local Program C</name>
    <description> This is "Local Program C" on Channel 1. 2 hours.
    </description>
    <rating>PG</rating>
    <filename>c:/tmp/LCI_ProgramStrC.mpg</filename>
  </program>
</channel>
<channel major=2 minor=1>
  <object_ID>0xFFFFF001</object_ID)>
  <channel_name>LC2</channel_name>
  <channel_description>This channel is setup as a roadblock
  </channel_description>
```

-continued

```
<program>
  <name> Local Program D</name>
  <description>This is "Local Program D" on Channel 2. Default.
  </description>
  <filename>c:/tmp/LCI_ProgramStrD.mpg</filename>
</program>
<program>
  <time_start>0</time_start>
  <time_end>3600</time_end>
  <name>Local Program E</name>
  <description> This is "Local Program E" on Channel 2. 1 hour.
  </description>
  <rating>PG</rating>
  <filename>c:/tmp/Local_ProgramStrE.mpg</filename>
</program>
<program>
  <time_start>3600</time_start>
  <time_end>9000</time_end>
  <name>Local Program F</name>
  <description> This is "Local Program F" on Channel 2. 1 ½ hours.
  </description>
  <rating>PG</rating>
  <filename>c:/tmp/LCI_ProgramStrF.mpg</filename>
</program>
</channel>
<channel major=3 minor=1>
  <object_ID>0xFFFFF002</object_ID)>
  <channel_name>LC3</channel_name>
  <channel_description>This channel is setup as a roadblock
  </channel_description>
  <roadblock> </roadblock>
  <program>
    <filename>c:/tmp/blue_screen.mpg</filename>
    <filename>c:/tmp/canadian_customs.mpg</filename>
    <filename>c:/tmp/landing_safety.mpg</filename>
  </program>
</channel>
```

The Now Playing File response back to the Content Scheduler 112 might be as shown below:

```
<base_time>982072815</base_time>
<time_stamp>0</time_stamp>
<channel major=1 minor=1>
  <object_ID>0xFFFFF000</object_ID)>
  <channel_name>LC1</channel_name>
  <program>
    <filename>c:/tmp/LCI_ProgramStrB.mpg</filename>
  </program>
</channel>
<channel major=2 minor=1>
  <object_ID>0xFFFFF001</object_ID)>
  <channel_name>LC2</channel_name>
  <program>
    <filename>c:/tmp/Local_ProgramStrE.mpg</filename>
  </program>
</channel>
<channel major=3 minor=1>
  <object_ID>0xFFFFF002</object_ID)>
  <channel_name>LC3</channel_name>
  <roadblock> </roadblock>
  <program>
    <filename>c:/tmp/ blue_screen.mpg </filename>
  </program>
</channel>
```

Now assume the Local Guide XML File 119 is modified by adding a <pause_all_but_roadblock> to the Local Guide XML File's base context 5 minutes after the base time, as shown below:

```
<?xml version="1.0" encoding="utf-8" ?>
<base_time>982072815</base_time>
<pause_all_but_roadblock></pause_all_but_roadblock>
<channel major=1 minor=1>
...
</channel>
```

The AV Streamers 114 will pause the files on Channels 1 and 2 and reset the programs on Channel 3 to the beginning of the first file. The Now Playing File response back to the Content Scheduler might be as shown below:

```
<base_time>982072815</base_time>
<time_stamp>300</time_stamp>
<pause_all_but_roadblocks> </pause_all_but_roadblocks>
<channel major=1 minor=1>
  <object_ID>0xFFFFF000</object_ID)>
  <channel_name>LC1</channel_name>
  <program>
    <filename>c:/tmp/LCI_ProgramStrB.mpg</filename>
  </program>
</channel>
<channel major=2 minor=1>
  <object_ID>0xFFFFF001</object_ID)
  <channel_name>LC2</channel_name>
  <program>
    <filename>c:/tmp/Local_ProgramStrE.mpg</filename>
  </program>
</channel>
<channel major=3 minor=1>
  <object_ID>0xFFFFF002</object_ID)
  <channel_name>LC3</channel_name>
  <roadblock> </roadblock>
  <program>
    <filename>c:/tmp/blue_screen.mpg</filename>
  </program>
</channel>
```

Assume the following play times for each of the files in the roadblock play list:

| | |
|---|---|
| blue_screen.mpg | 1 minute |
| canadian_customs.mpg | 5 minutes |
| landing_safety.mpg | 5 minutes |

As the roadblock channel works through its file list, the following Now Playing Files would be generated:

```
<base_time>982072815</base_time>
<time_stamp>360</time_stamp>
<pause_all_but_roadblocks> </pause_all_but_roadblocks>
<channel major=1 minor=1>
...
</channel>
<channel major=3 minor=1>
  <object_ID>0xFFFFF002</object_ID)>
  <channel_name>LC3</channel_name>
  <roadblock> </roadblock>
  <program>
    <filename>c:/tmp/canadian_customs.mpg</filename>
  </program>
</channel>
<base_time>982072815</base_time>
<time_stamp>660</time_stamp>
<pause_all_but_roadblocks> </pause_all_but_roadblocks>
<channel major=1 minor=1>
...
</channel>
<channel major=3 minor=1>
  <object_ID>0xFFFFF002</object_ID)>
  <channel_name>LC3</channel_name>
```

```
    <roadblock> </roadblock>
    <program>
        <filename>c:/tmp/landing_safety.mpg</filename>
    </program>
</channel>
<base_time>982072815</base_time>
<time_stamp>960</time_stamp>
<pause_all_but_roadblocks> </pause_all_but_roadblocks>
<channel major=1 minor=1>
    ...
</channel>
<channel major=3 minor=1>
    <object_ID>0xFFFFF002</object_ID)>
    <channel_name>LC3</channel_name>
    <roadblock> </roadblock>
    <program>
        <filename>c:/tmp/landing_safety.mpg</filename>
    </program>
</channel>
```

Note that the last Now Playing File shows that the roadblock list has looped back to the beginning. The Content Scheduler 112 may now modify the Local Guide XML File 119 to remove <pause_all_but_roadblock>. At the same time, it may modify the base_time by the duration of the PAUSE, which in this example was 11 minutes, or 660 seconds. The new base time would be 982073475, which is equivalent to Feb. 18, 2011, 14:11:00 UTC. This effectively moves the schedule out by 11 minutes for every program schedule described in the XML file. Only future events are actually shown to the user by the EPG Interpreter 124. The new Local Guide XML file results in the following NPF file:

```
<base_time>982073475</base_time>
<time_stamp>300</time_stamp>
<channel major=1 minor=1>
    <object_ID>0xFFFFF000</object_ID)>
    <channel_name>LC1</channel_name>
    <program>
        <filename>c:/tmp/LC1_ProgramStrB.mpg</filename>
    </program>
</channel>
<channel major=2 minor=1>
    <object_ID>0xFFFFF001</object_ID)
    <channel_name>LC2</channel_name>
    <program>
        <filename>c:/tmp/Local_ProgramStrE.mpg</filename>
    </program>
</channel>
<channel major=3 minor=1>
    <object_ID>0xFFFFF002</object_ID)
    <channel_name>LC3</channel_name>
    <roadblock> </roadblock>
    <program>
        <filename>c:/tmp/blue_screen.mpg</filename>
    </program>
</channel>
```

The above embodiments describe a method including providing a program guide, the program guide containing a start time and end time for the display of a first program, providing the first program for display at the start time, determining if the first program has been paused during the display of the first program, adjusting the end time for the display of the first program if the program has been paused, and providing an updated program guide containing the adjusted end time.

It is important to note that the process for the generation, modification, and synchronization of a program guide as described herein is advantageous for entertainment services systems that may include frequent and unexpected interruptions. The process described herein highlight the ability to delay the playback and display of programming, account for the delay, and shift the programming schedule of the content as necessary. The local generation and modification allows control over which programs and channels are delayed. For instance, as described above, the programs provided over one channel may be adjusted while the remaining programs on other channels are not delayed. This determination may be based on which programs were currently being displayed, or which channels or programs were interrupted. Further, a determination may be made that the current program may be pre-empted by a program following current program in order to begin the program following the current program at its originally scheduled start time. The current program may additionally pre-empt the program following the current program with the program following being joined in progress. Each of these conditions may be easily accommodated by the embodiments described herein.

In another embodiment, techniques are provided to determine how much CSSC 110 capacity is available to add more program channels or run other software on the same machine. In a system with limited resources, it is important to know when the system resources, including processing power (e.g., central processing unit capacity), is utilized to its maximum. In a video system, the system utilization is dependent on factors such as number of video multicast simultaneously, the distribution of the video files on the hard-disk, hard drive access times, other applications running concurrently on the processor, etc. In order to allow simultaneous multicast of maximum video channels, it is important to dynamically estimate and report load on the system at any given point in time. In accordance with the teaching of the present disclosure, this is achieved by measuring the sleep latency of the video streamer process for each video channel.

In this embodiment, AV Streamer 114 uses time stamps from each video packet to control the video output data rate. It sets its reference clock when the first packet is sent out. It reads the subsequent video packets and sleeps until its reference clock matches with the time stamp from the packet. This approach is more effective in reducing network traffic as oppose to sending null packets as was conventionally used. The sleep time between packets for a given channel decreases as the CSSC 110 load increases. The video pump generates a number, or value, between 0-255 based on the sleep time of all channels and periodically provides it as an output it to the Master Controller 111. As load on the CSSC 110 increases to a first predetermined threshold, the Master Controller 111 will perform steps necessary to keep the load under a second predetermined threshold, e.g., drop at least one programming channel, shut down predetermined applications, etc.

Figure 4:
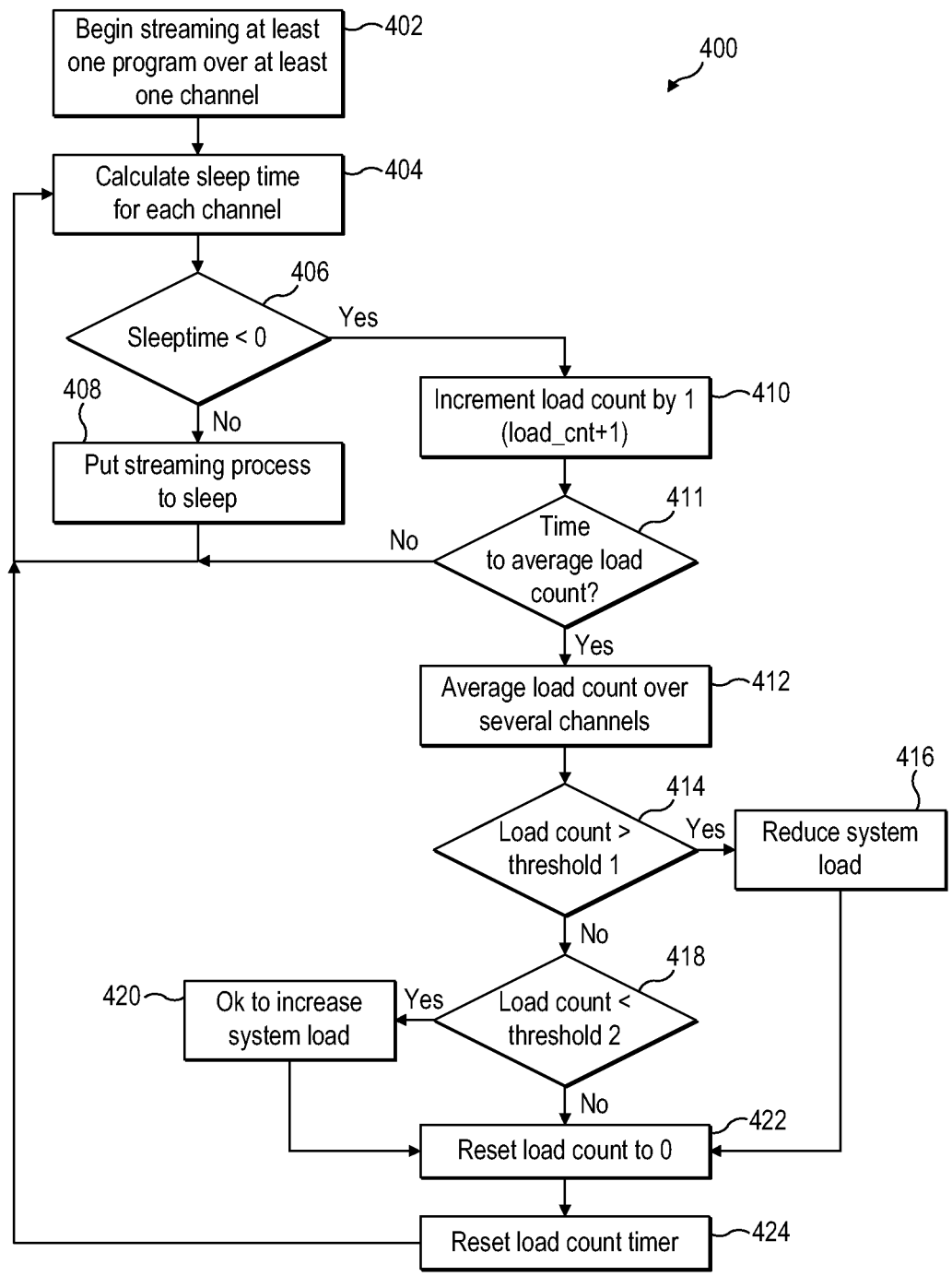
FIG. 4 is a flowchart of an exemplary embodiment process for estimating a system load of a video system in accordance with the present disclosure.

Referring to FIG. 4, a method 400 for estimating a system load of a video system is illustrated. Initially, in step 402, at least one program is streamed on at least one channel. Next, in step 404, a sleep time for the streamed at least one program is calculated, as will now be described below.

In the video stream, some packets contain a Reference Time Stamp (RTS). The first packet in the video stream having a RTS found since the start of the bit stream will be designated Packet 1, having a RTS value RTS_Value1. A subsequent packet with a RTS in the same bit stream will be designated Packet 2, having a RTS value RTS_Value2. The value SystemTime refers to a sample of a free running high-speed clock with a resolution of at least 1 msec taken at the time of the packet processing. For the first packet, the following parameters are set:

Base_RTS=RTS_Value1
Base_Time=SystemTime

For all subsequent packets with a RTS value, the SleepTime will be calculated as follows:

TimeDiff=(SystemTime−Base_Time)
RTS_new=(Base_RTS+TimeDiff)
RTS_Diff=(RTS_Value2−Base_RTS)
SleepTime=(RTS_Diff−TimeDiff)

RTS_Value2, which is a target value, is replaced with RTS_new, which is the actual departure time, in each subsequent packet. Sleep times for all the packets in a RTP datagram are aggregated and the thread is put to sleep after sending the datagram. For a lightly loaded system, the actual sleep duration will be close to the calculated sleep time value SleepTime. With an increase in system load, the actual sleep duration will start to go beyond the calculated sleep time value SleepTime, which will result in a negative value for the sleep time for subsequent packets.

In step 406, the process determines if the calculated sleep time value SleepTime is less than zero. If the calculated SleepTime is not less than zero, the streamer process is put to sleep and process 400 returns to step 404. If the calculated sleep time value SleepTime is less than zero, the load count, i.e., load_cnt, of the system is incremented by 1, step 410. This load count value is identified as a measure of sleep latency, or sleep time latency. The load count, or sleep latency, is a measure of the number of occurrences that the sleep time value determined above is less than zero, indicating that process load (i.e., the amount of processor capacity) may be insufficient to support the current system arrangement (i.e, number of programs, channels, extra processes, etc).

Next, in step 411, the process determines if it is time to average the load count via a load count timer. This step is performed at a fixed interval, e.g., about 20 seconds, and not every time an RTS and SleepTime are calculated. If it is determined that the load count timer has not reached a predetermined threshold, the process reverts back to step 404. Otherwise, in step 412, an average load count, or average sleep latency value, over all channels is calculated and reported to the Master Controller 111. The average load count is a number between 0-255 based on the sleep time value SleepTime of all channels currently being processed.

The Master Controller 111 will determine if the average load count is greater than a first predetermined threshold, step 414. As the load on the CSSC 110 increases to the first predetermined threshold, the Master Controller 111 will perform steps necessary reduce the system load, i.e., to keep the average load count under a second predetermined threshold, e.g., drop at least one programming channel, shut down predetermined applications, etc., in step 416. If the load count is less than the first predetermined threshold, the process will determine if the load count is greater than the second predetermined threshold, in step 418. Maximum safe values for the first and second predetermined thresholds are empirically established such that there is no video/audio performance degradation. This enables the CSSC 110 to stream an optimum number of video channels. If the load count is less than the second predetermined threshold, it is determined that it is allowable to increase the system load, step 420. In preparation of the next measurement level, the load count is reset to zero, step 422, and the load count timer is reset, step 424, and the process reverts to step 404.

Process 400 describes, in conjunction with system 100 described in FIG. 1, a process for monitoring and adjusting process operations based on a determination of process loading. The process includes processing or streaming programs onto a plurality of signals that are allocated to channels or frequencies in a signal distribution network. The process calculates a load count or sleep latency value using the originally calculated sleep times and the actual sleep times determined for the programs in the signals. An average value sleep latency over a period of time is determined based on the sleep latency values for the signals. The process may then alter the number of programs or the number of signals currently being processed based on the average sleep latency value. The process may increase programs or signals if the load is not large enough (i.e., capacity is underutilized) or may decrease programs or signals if the large is too large (i.e., capacity is underutilized). The process may also alter other concurrent processes instead of altering the number of programs or signals. As a result, the process attempts to maintain proper process loading, preventing, among other things, issues with the delivery of program content to users of the system. The issues may include video freezing, macroblocking, audio dropout, or other distortions and content display errors associated with video and audio content.

Although embodiments which incorporate the teachings of the present disclosure have been shown and described in detail herein, those skilled in the art can readily devise many other varied embodiments that still incorporate these teachings. Having described preferred embodiments of a system and method for providing a program guide for a video distribution system (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure as outlined by the appended claims.

What is claimed is:

1. A method comprising:
   providing a program guide, the program guide containing a plurality of channels, each channel including a start time and end time for the display of at least one program;
   providing a first program for display at the start time;
   determining if the first program has been paused during the display of the first program;
   adjusting the end time for the display of the first program if the program has been paused;
   determining if the pause is to be applied to each of the plurality of channels;
   adjusting the end time for at least one program on each of the plurality of channels if the pause is to be applied to each of the plurality of channels; and
   providing an updated program guide containing the one or more adjusted end times.

2. The method of claim 1, further comprising:
   adjusting a start time for display of a second program that follows the first program on a channel; and
   providing an updated program guide containing the adjusted start time for the display of the second program.

3. The method of claim 2, wherein the start time is determined by a base time and a start time offset and the end time is determined by the base time and an end time offset.

4. The method of claim 2, wherein at least one of the start time and the end time is included in the updated program guide in an adjusted time cell.

5. The method of claim 3, further comprising:
   determining a duration of the pause; and
   adding the determined duration to the base time.

6. The method of claim 3, further comprising:
   determining a duration of the pause; and
   adding the determined duration to the start time offset and end time offset.

7. The method of claim 4, wherein the adjusted time cell (310) includes the adjusted end time for the first program.

8. An apparatus for providing a program guide in a video system, the apparatus comprising:
- an audio video streaming device that provides a plurality of channels, each channel including at least one program for display;
- a content scheduler coupled to the audio video streaming device, the content scheduler determining if a pause has been executed, whether the pause applies to each of the plurality of channels, and adjusting an end time for the display of one or more programs; and
- a program guide generator coupled to the content scheduler, the program guide generator providing a program guide containing information for a plurality of channels, each channel including information for at least one program, the program guide generator further providing an updated program guide with the adjusted end time for the display of one or more programs.

9. The apparatus of claim 8, wherein the content scheduler adjusts a start time for display of a second program that follows a first program on a channel and wherein the program guide generator provides an updated program guide containing the adjusted start time for the display of the second program.

10. The apparatus of claim 8, wherein the start time is determined by a base time and a start time offset and the end time is determined by the base time and an end time offset.

11. The apparatus of claim 9, wherein the updated program guide includes at least one of the adjusted end time or the adjusted start time in an adjusted time cell.

12. The apparatus of claim 10, wherein the content scheduler determines a duration of the pause and adds the determined duration to the base time.

13. The apparatus of claim 10, wherein the content scheduler determines a duration of the pause and adds the determined duration to the start time offset and end time offset.

14. The apparatus of claim 11, wherein the adjusted time cell includes the adjusted end time for the first program.

* * * * *